(12) United States Patent
Skuratowicz

(10) Patent No.: US 7,057,032 B2
(45) Date of Patent: Jun. 6, 2006

(54) LOW MOISTURE PROCESS FOR EXTRACTING HEMICELLULOSE

(75) Inventor: Roman Skuratowicz, Hickory Hills, IL (US)

(73) Assignee: Corn Products International, Inc., Westchester, IL (US)

( * ) Notice: Subject to any disclaimer, the term of this patent is extended or adjusted under 35 U.S.C. 154(b) by 519 days.

(21) Appl. No.: 10/350,610

(22) Filed: Jan. 24, 2003

(65) Prior Publication Data

US 2004/0147738 A1 Jul. 29, 2004

(51) Int. Cl.
*C08B 1/00* (2006.01)
*C08B 3/28* (2006.01)
*C07H 1/06* (2006.01)
*C07H 1/08* (2006.01)

(52) U.S. Cl. .................. 536/56; 536/123.1; 536/124; 536/128

(58) Field of Classification Search ............. 536/56, 536/123.1, 124, 128
See application file for complete search history.

(56) References Cited

U.S. PATENT DOCUMENTS

| | | | | |
|---|---|---|---|---|
| 2,801,955 | A | * 8/1957 | Rutenberg | ............ 435/277 |
| 3,716,526 | A | 2/1973 | Schweiger | |
| 4,226,982 | A | 10/1980 | Blount | |
| 6,147,206 | A | 11/2000 | Doner et al. | |
| 6,168,857 | B1 | 1/2001 | Andersen et al. | |
| 6,179,905 | B1 | 1/2001 | McPherson et al. | |
| 6,287,412 | B1 | 9/2001 | Giesfeldt et al. | |
| 6,368,443 | B1 | 4/2002 | Fitt et al. | |

* cited by examiner

*Primary Examiner*—James O. Wilson
*Assistant Examiner*—Everett White
(74) *Attorney, Agent, or Firm*—Norris, McLaughlin & Marcus

(57) ABSTRACT

The invention concerns a process for extracting hemicellulose from fiber, such as corn fiber. The process comprises agitating at least fiber, caustic and optional added water at a moisture content from about 10% to about 60% at high speeds in a highly fluidized state. The process substantially instantaneously extracts the hemicellulose from the fiber. Heat may be applied in the process to extract and dry the hemicellulose substantially simultaneously.

16 Claims, No Drawings

LOW MOISTURE PROCESS FOR EXTRACTING HEMICELLULOSE

BACKGROUND OF THE INVENTION

1. Field of the Invention

The invention pertains to extracting hemicellulose from fiber in a low moisture process. Fiber comprising cellulose and hemicellulose, caustic and relatively low amounts of water are agitated at high speeds causing a highly fluidized state that provides substantially instantaneous extraction of the hemicellulose portion of the fiber.

2. The Prior Art

Corn fiber is comprised primarily of cellulose, hemicellulose, and trace amounts of lignin, in addition to residual starch, protein, oil and ash. Other vegetable fibers also have similar compositions, such as sago, wheat, tapioca, bagasse, other cellulose and hemicellulose containing species, and the like. Fiber can be treated with alkali to extract the majority of the hemicellulose, as well as a portion of the protein, starch, and ash. Hemicellulose has many food and industrial applications (with or without additional refinement), including as a thickener, a component of an adhesive and a tackifier, to name a few. For example, starch based corrugating adhesives of the carrier, no-carrier and carrier no-carrier type comprising added hemicellulose are described U.S. Pat. No. 5,358,559.

Hemicellulose can be extracted from cellulose by using alkali such as calcium hydroxide, potassium hydroxide, or sodium hydroxide. This method is generally referred to as aqueous extraction, which has been difficult because of the cost of using large quantities of water for reaction and the difficulty in recovering hemicellulose from water solutions due to its high viscosity and solubility. Aqueous extraction generally requires dilute reaction concentrations, typically around 10% solids content (90% liquid).

There is a need for processes involving the aqueous extraction of hemicellulose which does not require large quantities of water. Alkali extraction of hemicellulose in solutions having higher solids content than typically used would alleviate the problems in the art.

We have developed a method for treating fiber in a semi-dry reaction (i.e. moisture content less than about 60%, resulting in non-fluid material) to obtain hemicellulose. In the method, the fiber is agitated at high speeds with alkali and water in a highly fluidized state, allowing substantially instantaneous extraction of the hemicellulose portion of the fiber from an insoluble complex to a soluble semi-dry fraction. The method eliminates the need for large quantities of water to extract hemicellulose from fiber and provides for reduced processing costs, reduced level of difficulty in recovering the hemicellulose and resource conservation by reducing the amount of water needed for aqueous extraction.

In the present Specification all parts and percentages are on a weight by weight basis unless otherwise specified.

SUMMARY OF THE INVENTION

The invention concerns a process for extracting hemicellulose from fiber with alkali at a moisture content from about 10% to about 60%, preferably from about 15% to about 50%, and most preferably from about 20% to about 40%. The process comprises the steps of agitating the fiber in a highly fluidized state with alkali and relatively low amounts of moisture (water). The process results in substantially instantaneous extraction of the hemicellulose portion of the fiber from an insoluble complex to a soluble semi-dry fraction. The composition resulting from the process can be used "as-is" or the hemicellulose portion can be separated and, optionally, dried. In a preferred embodiment of the invention, however, the process is conducted at elevated temperature such that the high agitation and temperature substantially simultaneously extracts and dries the hemicellulose.

DETAILED DESCRIPTION OF THE INVENTION

The invention concerns a process for extracting, e.g. solubilizing, hemicellulose from fiber under semi-dry conditions. The process comprises agitating at a moisture content from about 10% to about 60%, preferably from about 15% to about 50% and most preferably from about 20% to about 40% at speeds of about 300 rpm to about 2,000 rpm, preferably from about 500 rpm to 1,750 rpm at least fiber, caustic and, optionally, added water. The amount of caustic may be about 10% to about 40%, preferably from about 10% to about 25%, by dry weight of the fiber. The moisture content may be from residual water within the fiber or water may be added, i.e. added water, to achieve the desired moisture level. The agitation speed causes the fiber, alkali and added water to enter a highly fluidized state for the alkali reaction to ensure consistency. The process substantially instantaneously extracts the hemicellulose from the fiber, however, the fiber, caustic and optional added water are preferably agitated for a time period of about 10 seconds to about 10 minutes, most preferably from about 10 seconds to about 5 minutes. The mixture from the process comprising hemicellulose may be used "as is", or the hemicellulose may be separated and/or dried. In a preferred embodiment of the invention, the process comprises heating during agitation up to a temperature of about 180° F., preferably from about 90° F. to about 150° F., to simultaneously extract and dry the hemicellulose.

In addition to extracting hemicellulose from fiber, the process of the invention may be incorporated into other reactions involving extracted hemicellulose. Examples are neutralization, viscosity reduction, derivatization and the like.

Enzymes, acids, oxidants or combinations thereof may be added to the fiber, caustic and optional added water during or before agitation to reduce viscosity and/or color of the extract. Acids and/or bases can be included in the agitation step to reduce pH.

Hemicelluloses are described in U.S. Pat. No. 5,358,559 which is incorporated herein in its entirety by reference. Hemicellulose is generally extracted from corn fibers, however, hemicellulose may also be extracted from tapioca, wheat, sage, bagasse and the like, and combinations thereof. Suitable corn fibers for use in the process include crude fiber, such as corn hull, typically described as feed, and fiber from spent germ. More finished products such as dietary corn fiber, which is made for human consumption, may also be used. Crude fiber generally contains from about 20% to about 40% hemicellulose and dietary corn fiber generally contains from about 50% to about 80% hemicellulose.

Any strong base can be used for the caustic in the process. Preferably, however, alkali metal hydroxides, such as sodium hydroxide, potassium hydroxide or calcium hydroxide are used. Combinations of caustics may also be used.

The process may be conducted in any suitable piece of equipment that can provide the acceptable agitation and, if desired, temperature. Means for mixing such as those selected from the group consisting of mixers, blenders, reactors (including thermal reactors), extruders, size reducers, mills and combinations thereof may be used. Examples of equipment that can be used, either separately or in combination, are TURBULIZER® mixers/blenders and SOLIDAIRE® thermal reactors available from Hosokawa Bepex Corporation, Minneapolis, Minn., USA ("Hosokawa"). The SOLIDAIRE® thermal reactors are particularly useful in the embodiment of the invention wherein the hemicellulose is simultaneously extracted and dried. Size reduction equipment available from Hosokawa under the trade name PULVOCRON can be used, particularly for separation and drying of the hemicellulose after the process.

EXAMPLES

Example 1

Hemicellulose was extracted from dry fiber material having moisture content less than 10% using an eight inch diameter, four foot long SOLIDAIRE® thermal reactor from Hosokawa ("SOLIDARE 8-4"). Four pounds of liquid caustic were diluted into 16 pounds of water. This solution was added slowly to 18 pounds of the dry fiber material and mixed thoroughly. The mixture was then fed by screw conveyer into the SOLIDAIRE 8-4, at a rate of one half pound per minute, providing a 10 minute residence time in the unit. The SOLIDAIRE® 8-4 was jacket heated to 360° F., with counter-current air moving at a rate of 10 feet per minute.

The amount of soluble material in the fiber mixture after treatment in the SOLIDARE® 8-4 was determined by the following method. Ten grams of treated fiber mixture is dispersed in water to make 100 grams of solution. This mixture is shaken for two minutes, then placed into centrifuge tubes and centrifuged at 8,000 RPM in a chermle centrifuge for 10 minutes. The refractive index of the liquid portion is measured to indicate the relative yield of soluble material. The fiber solution had about 36% solubles.

Example 2

A TURBULIZER® from Hosokawa was used to coat 1,000 pounds of spent flake fiber with caustic. Diluted liquid caustic was pumped at a one to one ratio to dry fiber into the TURBULIZER®, where the fiber was evenly coated with a dilute caustic solution. The coated fiber was fed directly into a sixteen inch diameter, eight foot long SOLIDAIRE® thermal reactor ("SOLIDAIRE® 16-8"), where the coated fiber was reacted and partially dried. The partially dried treated fiber from the SOLIDAIRE® 16-8 was milled and completely dried in a PULVOCRON size reducer from Hosokawa to a moisture of 5% to 8% and a particle size where 50% of material passes through a 200 mesh screen. Four runs were performed for this example, two wherein the caustic was diluted to 10% solids (one having heat applied in the thermal reactor) and two wherein the caustic was diluted to 15% solids (one having heat applied in the thermal reactor). In the trials where the heat was applied, the thermal jacket of the SOLIDAIRE® 16-8 was heated to 350° F. and no heated air was applied.

Samples from runs with both the 10% solids caustic and 15% solids caustic were analyzed for percent solubles in accordance with the analytical procedure described above in Example 1 and for high-molecular weight ("HMW") solubles using size exclusion chromatography performed in accordance with the procedures described in Stone, Robert G. and Krasowski, Joseph A., *Determination of Molecular Size Distributions of Modified Corn Starch by Size Exclusion Chromatography* published in Analytical Chemistry at Anal. Chem., 1981, 53, 736–737, which is incorporated in its entirety herein by reference. Results are set forth in Table 1.

TABLE 1

| Sample | Solubles | HMW Solubles |
|---|---|---|
| 10% no heat | 29% | 18% |
| 10% heat | 30% | 20% |
| 15% no heat | 44% | 29% |
| 15% heat | 45% | 28% |

Example 3

Samples of material were prepared in porcelain dishes by coating 50 grams dry basis of 55% moisture corn hull fiber with liquid caustic in amounts of 10%, 15%, 20% and 25% by dry weight of fiber material. The fiber was evenly coated with the caustic and the porcelain dishes were placed overnight in an air oven at 50° C. The coated fiber was then milled through a 0.020 inch screen with a MIKRO-SAMPLMILL® from Hosokawa.

Each sample was analyzed for percent solubles and percent organic solubles in accordance with the analytical procedure set forth in Example 1. The results are presented in Table 2.

TABLE 2

| Sample | Solubles | Organic Solubles |
|---|---|---|
| 10% caustic | 37% | 32% |
| 15% caustic | 48% | 40% |
| 20% caustic | 63% | 49% |
| 25% caustic | 68% | 46% |

What is claimed is:

1. A process for extracting hemicellulose from fiber comprising the step of agitating fiber, caustic and, optionally, added water at a moisture content from about 10% by weight to about 60% by weight of the fiber, caustic and optional added water at speeds of about 300 rpm to about 2,000 rpm.

2. The process of claim 1 wherein the moisture content is about 15% by weight to about 50% by weight of the fiber, caustic and optional added water.

3. The process of claim 1 wherein the moisture content is about 20% by weight to about 40% by weight of the fiber, caustic and optional added water.

4. The process of claim 1 wherein the caustic is in amount of about 10% by dry weight of the fiber to about 40% by dry weight of the fiber.

5. The process of claim 4 wherein the amount of caustic is about 10% by dry weight of the fiber to about 25% by dry weight of the fiber.

6. The process of claim 1 wherein the agitation is for about 10 seconds to about 10 minutes.

7. The process of claim 1 comprising the further step of heating during agitation up to a temperature of about 180° F.

8. The process of claim 7 wherein the temperature is from about 90° F. to about 150° F.

9. The process of claim 1 wherein the fiber is selected from the group consisting of corn, tapioca, wheat, sago, bagasse and combinations thereof.

10. The process of claim 1 wherein the caustic comprises an alkali metal hydroxide.

11. The process of claim 10 wherein the alkali metal hydroxide is selected from the group consisting of sodium hydroxide, potassium hydroxide, calcium hydroxide and combinations thereof.

12. The process of claim 1 comprising the further step of adding materials selected from the group consisting of enzymes, acids, oxidants and combinations thereof to the fiber, caustic and optional added water during or before the agitation to reduce the viscosity or color of the extracted hemicellulose.

13. The process of claim 1 conducted in a means for mixing.

14. The process of claim 13 wherein the means for mixing is selected from the group consisting of mixers, blenders, reactors, extruders, size reducers, mills and combinations thereof.

15. The process of claim 14 wherein the reactor is a thermal reactor.

16. The process of claim 1 comprising the further step of adding materials selected from the group consisting of acids, bases and combinations thereof to the fiber, caustic and optional added water during the agitation to reduce pH.

* * * * *